United States Patent [19]

Fey et al.

[11] 4,071,588

[45] Jan. 31, 1978

[54] PROCESS FOR PRODUCTION OF MAGNETITE SPHERES WITH AN ARC HEATER

[75] Inventors: Maurice G. Fey, Plum Borough; Charles B. Wolf, Irwin; Paul E. Martin, West Mifflin Borough; Francis J. Harvey, II, Murrysville, all of Pa.

[73] Assignee: Westinghouse Electric Corporation, Pittsburgh, Pa.

[21] Appl. No.: 748,794

[22] Filed: Dec. 9, 1976

Related U.S. Application Data

[63] Continuation-in-part of Ser. No. 603,578, Aug. 11, 1975, abandoned.

[51] Int. Cl.² .............................................. B29C 23/00
[52] U.S. Cl. ...................................... 264/15; 250/542
[58] Field of Search .................... 264/10, 15; 204/164; 250/542

[56] References Cited

U.S. PATENT DOCUMENTS

| | | | |
|---|---|---|---|
| 3,708,409 | 1/1973 | Bainbridge | 204/164 |
| 3,749,763 | 7/1973 | Scammon, Jr. et al. | 204/164 |
| 3,989,512 | 11/1976 | Sayce | 264/15 |

Primary Examiner—Robert F. White
Assistant Examiner—James R. Hall
Attorney, Agent, or Firm—L. P. Johns

[57] ABSTRACT

A process for the production of magnetic spheres from grit of magnetite ore by introducing the grit into an arc heated gas jet, thus heating the grit to a temperature of at least 1600° C, and allowing the melted magnetite droplets to spheroidize and cool to a solid state.

9 Claims, 7 Drawing Figures

4,071,588

PROCESS FOR PRODUCTION OF MAGNETITE SPHERES WITH AN ARC HEATER

This application is a continuation-in-part of application Ser. No. 603,578, filed Aug. 11, 1975, now abandoned and assigned to the same assignee as this application.

BACKGROUND OF THE INVENTION

1. Field of the Invention

This invention relates to a process for converting particles of magnetite ore grit into magnetic spheres by melting the grit in an arc heated gas jet.

2. Description of the Prior Art

Tiny spheres of about 100 mesh or less, of magnetite ore ($Fe_3O_4$) are useful in various industrial processes. Heretofore the pheres have been produced by an alternate process of atomizing and freezing which process has had the disadvantage of difficulty of control of particle size of the product, resulting in low product yield. From time to time apparatus and methods for chemically treating materials, such as ores, by plasma arc heaters have been disclosed in the prior art; i.e. in U.S. Pat. Nos. 3,661,764, 3,708,409 3,749,763, and 3,811,907. Such apparatus and methods are unsuitable for the production of magnetite spheres, because they include the use of carbon-containing electrodes which if contacting by magnetite ($Fe_3O_4$) result in a chemical change of the $Fe_3O_4$ and of the electrodes. Other electrodes comprised of metals such as tungsten are also destroyed by $Fe_3O_4$, and, in addition, require the use of inert gases to maintain the integrity of the electrode. Accordingly, there is a need for an alternate method of producing magnetite spheres that would be conducive to a continuous yield of the desired particle size.

SUMMARY OF THE INVENTION

It has been found in accordance with this invention that a reliable process for the production of magnetite spheres comprises the steps of introducing particles of magentic grit into an arc heated gas jet to melt the grit to produce liquid droplets of magnetite, which droplets become spherical in shape because of surface tension forces, and upon continued falling cool into solid spherical particles.

The advantage of this process is that it comprises thermal fusiom of discrete particles, which avoids the problem of size control encountered in the prior art method, whereby magnetite spheres of the desired size are produced at an economical rate.

DESCRIPTION OF THE PREFERRED EMBODIMENTS

Generally, the process of this invention comprises the steps of (1) heating size grit or particles of magnetite ore to the liquid state whereby surface tension forces induce spheroidization of the particles, and (2) cooling the spheroidized particles to the solid state.

Figure 1:
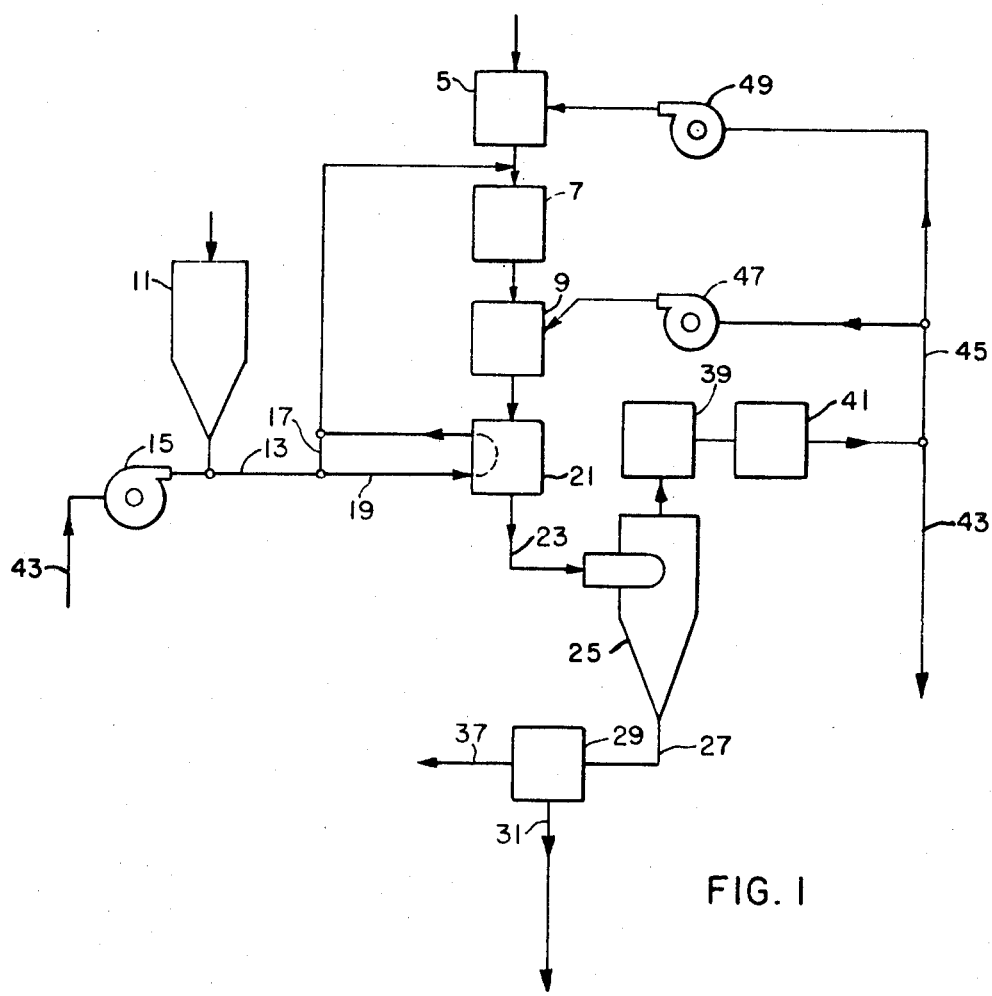
FIG. 1 is a flow sheet showing a process for the production of magnetite spheres.

The means for performing that process is disclosed diagrammatically in FIG. 1 and comprises an arc heater 5, a melting zone 7, and a cooling zone 9. More particularly, the material to be processed is a naturally occurring mineral, magnetite ore ($Fe_3O_4$), which is crushed to a line sized particle or grit and introduced through a storage bin 11 from where it is transferred through a conduit 13 by transport gas that is introduced into the conduit by compressor 15. The particles of the magnetite ore varies from 44 to 149 microns (100 to 325 mesh) with a preferred size of 74 microns (200 mesh).

The particles are then conducted directly to the melting zone 7 via a conduit 17, or indirectly through a conduit 19 into a heat exchanger 21, where sensible heat is transferred from the hot exhaust gases leaving the cooling zone 9. From the heat exchanger the particles are injected into the arc hyperheated gases at the exit of the arc heater 5 where heating and fusion occurs in the melting zone 7. For that purpose the hyperheated gases have a temperature of at leas 1600° C which is the melting point of magnetite ore. The melting zone is about ½ to 1 foot in diameter and up to 3 feet long. Heating occurs primarily by conduction and convection.

The arc heater 5 is preferably powered with 150–1500 kilowatts. The preferred gas atmosphere in the melting zone 7 which is introduced through the arc heater 5 is air flowing at a rate of from 100 to 1000 pounds per hours. However, other neutral gases may be used which are neither oxidizing or reducing to the magnetite so long as the gas contains from about 5.9% to 21% oxygen. Air contains 21% oxygen. If the mole fraction of oxygen is less than 5%, the magnetite ore ($Fe_3O_4$) is reduced to a lower oxide state, such as wustite (FeO), or a combination of $Fe_3O_4$ and FeO. If the mole fraction of oxygen in the gas is considerably higher than 21%, the $Fe_3O_4$ is oxidized to a higher oxide state, such as $Fe_2O_3$, or a combination of $Fe_3O_4$ and $Fe_2O_3$. Of these only $Fe_3O_4$ is magnetic.

When the magnetite particles are liquefied, surface tension forces cause each droplet to spheroidize, and after flowing through the melt zone, they enter the cooling zone 9 where colder gas or water may be injected into the steam of falling molten droplets to absorb the heat of fusion. Cooling may also be affected by radiation to the colder walls of the cooling chamber while molten, the liquid droplets should not touch each other or the walls of the cooling zone through which they drop in order to preserve sphericity.

Figure 2:
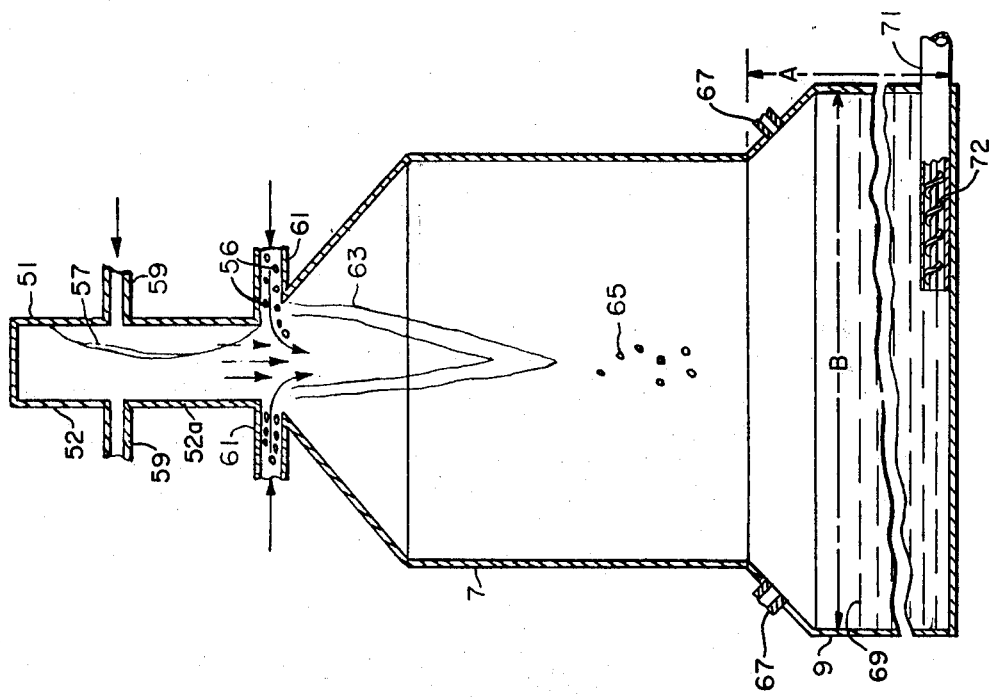
FIG. 2 is a vertical sectional view through a single arc heater system.

After leaving the melting zone 7, the droplets are cooled by radiation to the surroundings and/or by convection from a cold stream of a fluid such as cool air or water. The cooling zone 9 is necessarily long enough to enable the liquid droplets to solidify while dropping through the zone before they reach the lower end of the zone. For that reason the zone is long enough vertically for droplets to solidify into perfect spheres. It has been found that the preferred length of the cooling zone is at least about three times the diameter of the zone, the primary factors controlling the length being the operating temperature and mass of the droplets entering cooling zone. For example, as shown in FIG. 2, the length A of the cooling zone is equal to at least three times the diameter B thereof. Alternatively, the droplets may be quenched in a pool of water at the bottom of the cooling zone 9. Quenching may also be accomplished by gas injection or simply by permitting the droplets to drop through a cold wall pipe and the heat of fusion is thus transferred by radiation to the pipe walls.

After leaving the cooling zone 9, the hot particle-laden gas stream may flow through the heat exchanger 21 which may be a coil wound along the wall of cooling zone or a separate device, from where it is transferred via conduit 23 to a gas solid separator 25, such as a cyclone, bag filter, or a suitable separation device or combination of devices from where the solids are conducted through a conduit 27 to a sizing screen 29 for selecting particles of the proper size and to remove offsized particles which are recycled. Particles of the proper size are then removed at 37.

The gases leave the separator 25 to pass through a cooler 39 and cleaner 41 from where the gases flow either through the conduit 43 to a gas compressor 15, or through a conduit 45 to a compressor 47 or a compressor 49. The compressor 47 drives quench gas into the cooling zone 9, the compressor 49 drives arc heater gas into arc heater 5 at a rate of from about 100 to 1000 pounds per hour.

Figure 3:
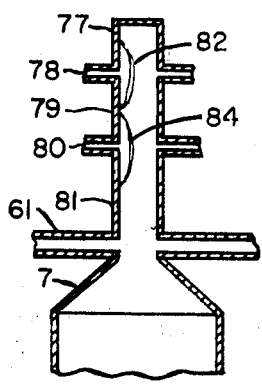
FIGS. 3 and 4 are sectional views of three-phase arc heater structures.
Figure 4:
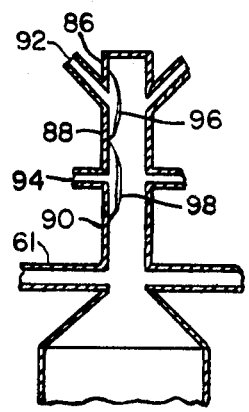

Three alternate power sources may be used for the arc heater 5 including direct current, single-phase A.C., and three-phase A.C. Any of these power sources may be employed in a self-stablizing arc heater of the type shown in FIG. 2 wherein a single arc heater 51 is disposed above the melting zone 7 which is above the cooling zone 9. The sincle three-phase arc heater configurations are shown in FIGS. 3 and 4. In the embodiment of FIG. 2 where a single arc heater 51 is employed, the use of D.C. is preferred to A.C., because the particles 56 are injected into a hot gas stream that is free from temperature perturbations, and a higher degree of spheroidization is obtained.

Figure 5:
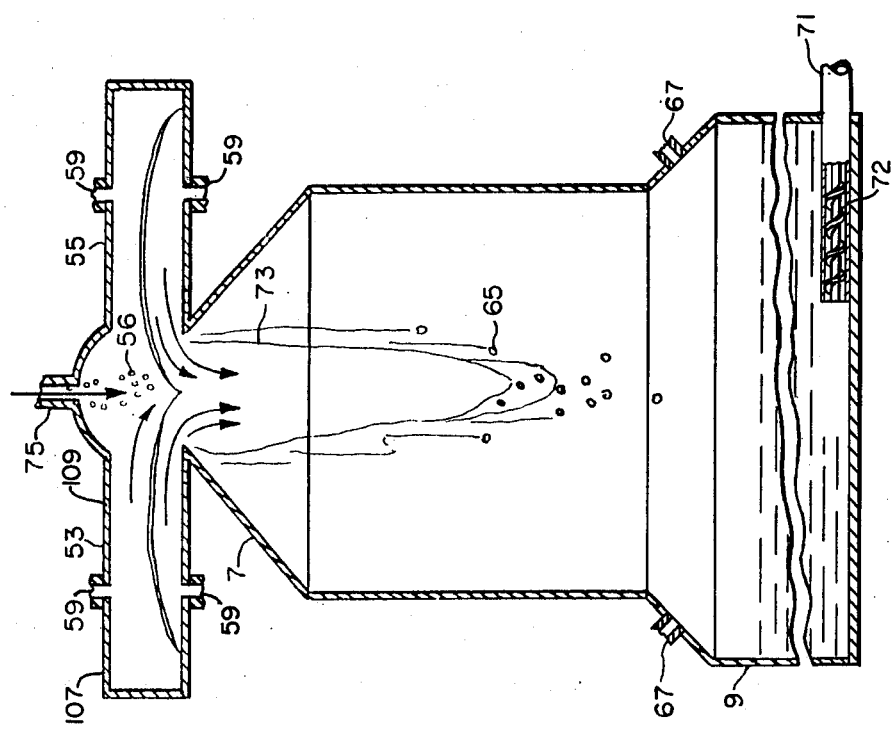
FIG. 5 is a vertical sectional view through another embodiment of the invention characterized by a three-phase arc heater assembly.

The arc heater 51 is similar in construction and operation to that disclosed in U.S. Pat. No. 3,705,975 entitled "Self-Stabilization Arc Heater Apparatus" of which the inventors are Charles B. Wolf and Maurice G. Fey. The arc heater 51 is preferably operated but not limited to, operation on D.C. power. It may also be a single-phase, self-stabilization A.C. device. In either mode it is capable of power levels up to about 3500 kilowatts, or up to 10,000 kilowatts for a three-phase plant installation as shown in FIG. 5. For the practice of this invention it is preferred that a three-arc heater system be employed, one for each of the three phases of the A.C. power supply. Two arc heaters 53 and 55 are shown in FIG. 5.

In FIG. 2 the arc heater 51 provides an arc 57 and includes an annular gas inlet 59 through which gases are directed downwardly into the melting zone 7. An inlet 61 for the particles 56 is provided between the arc heater 51 and the melting zone 7. When the particles 56 are introduced through the inlet 61 they commingle with the gas stream or jet 63 at a temperature of at least 1600° C, where particles are melted and spheroidized. Care must be taken to inject the particles with sufficiently high momentum with respect to that of the arc heated gas stream that the partiles mix well with the hot gas stream. If the particles are inected with too little momentum, they do not penetrate the stream and are not sufficiently heated. If they are injected with too much momentum, the particles penetrate through the hot gas stream and impinge on the opposite wall. As the liquid droplets 65 leave the gas jet 63, they pass through a cooling zone 9 where inlets 67 are provided for spraying a coolant gas or fluid, such as water, on the liquid droplets 65 to solidify them before they reach the lower end of the cooling zone 9.

An alternative or supplement to the coolant inlet 67 is the provision of a pool 69 of quenching fluid, such as water, at the lower end of the cooling zone 9. An outlet 71 for the solidified spheres is provided at the bottom of the cooling zone, and for that purpose a suitable conveyor means, such as a screw conveyor 72, may be provided for removing the solidified spheres.

In the phase system shown in FIG. 3 three electrodes 77, 79, and 81 are axially disposed and separated by two axially spaced gaps 78 and 80. The electrodes 77, 79, 81 are connected to the three phases of the line, and arcs 82 and 84 are drawn between the three electrodes 77, 79, 81 as shown.

In FIG. 4 a system similar to that of FIG. 3 except that there are three electrodes 86, 88, 90 that are axially disposed and separated by spaced gaps 92 and 94. Arcs 96 and 98 are drawn between the electrodes 86, 88, 90 as shown.

The arc heater system shown in FIG. 5 differs from that in FIG. 1 in that three arc heaters, (two heaters 53, 55 are shown), disposed subtantially horizontally with a gas jet 73 extending downwardly into the melting zone 7. An inlet 75 for particles of raw magnetite ore is located above the arc heater 53, 55 and substantially axially of the melting zone 7 so that the spheroidized droplets flow through the gas jet 73 then pass through the quenching zone 9.

In the three-phase arc heater system of FIG. 5 the hyperheated gas streams or jets impinge upon one another in the melting chamber 7. The stream of particulated magnetite ore or particles 56 is injected through the impingement point of the three jets. The particles are well dispersed in the arc heated gas jet to provide good mixing and fusion. In this system the particles are admitted axially to assure entrainment into the hot gas stream, thus providing the radial momentum consideration. Uniform dispersion tends to reduce the probability of agglomeration of liquid droplets 65 which would result in unwanted oversized material. Since the resultant power wave of the three-phase network contains a 360 cycle oscillation whose magnitude is only a tiny fraction (less than 5%) of the fundamental, the gas temperature is nearly constant and as a result, nearly complete spheroidization is obtained.

Figure 6:
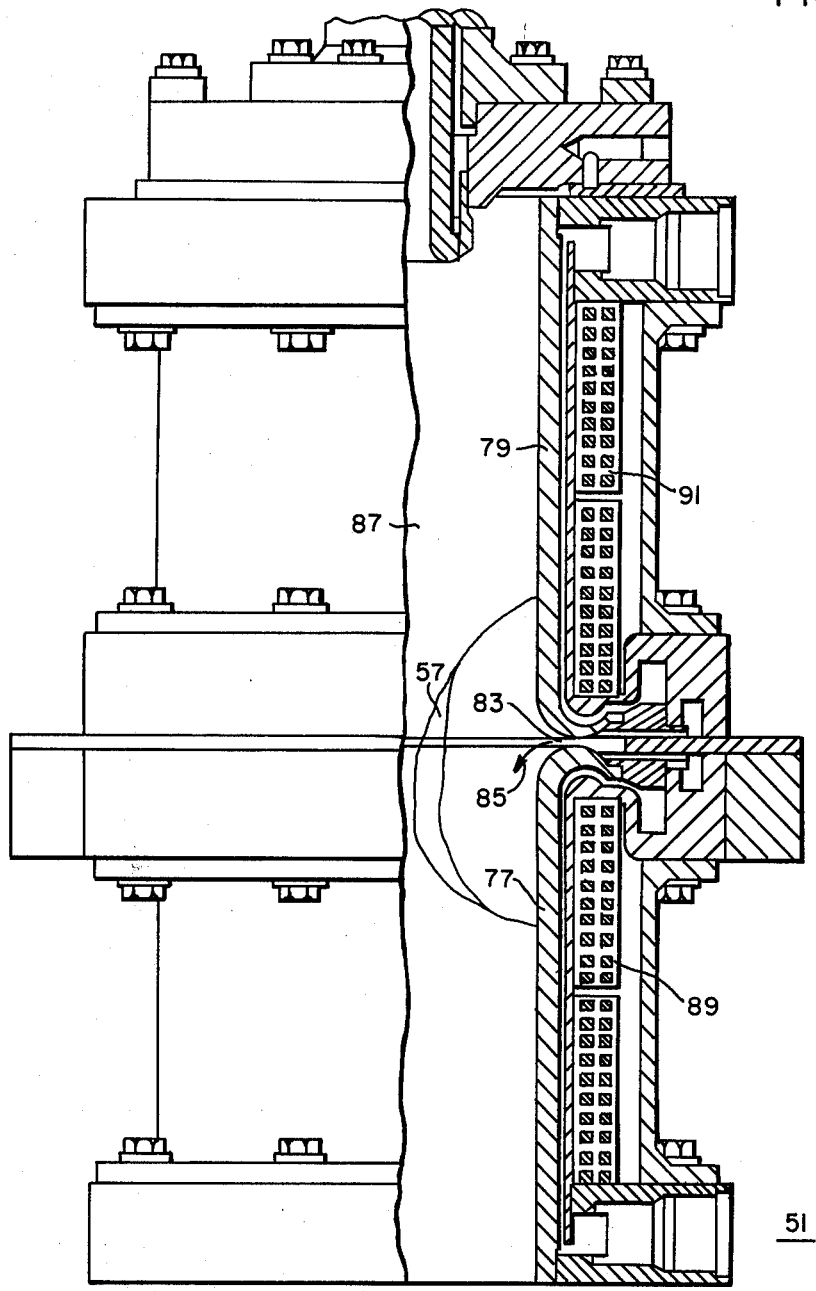
FIG. 6 is an elevational view, and partially in section, of an arc heater.
Figure 7:
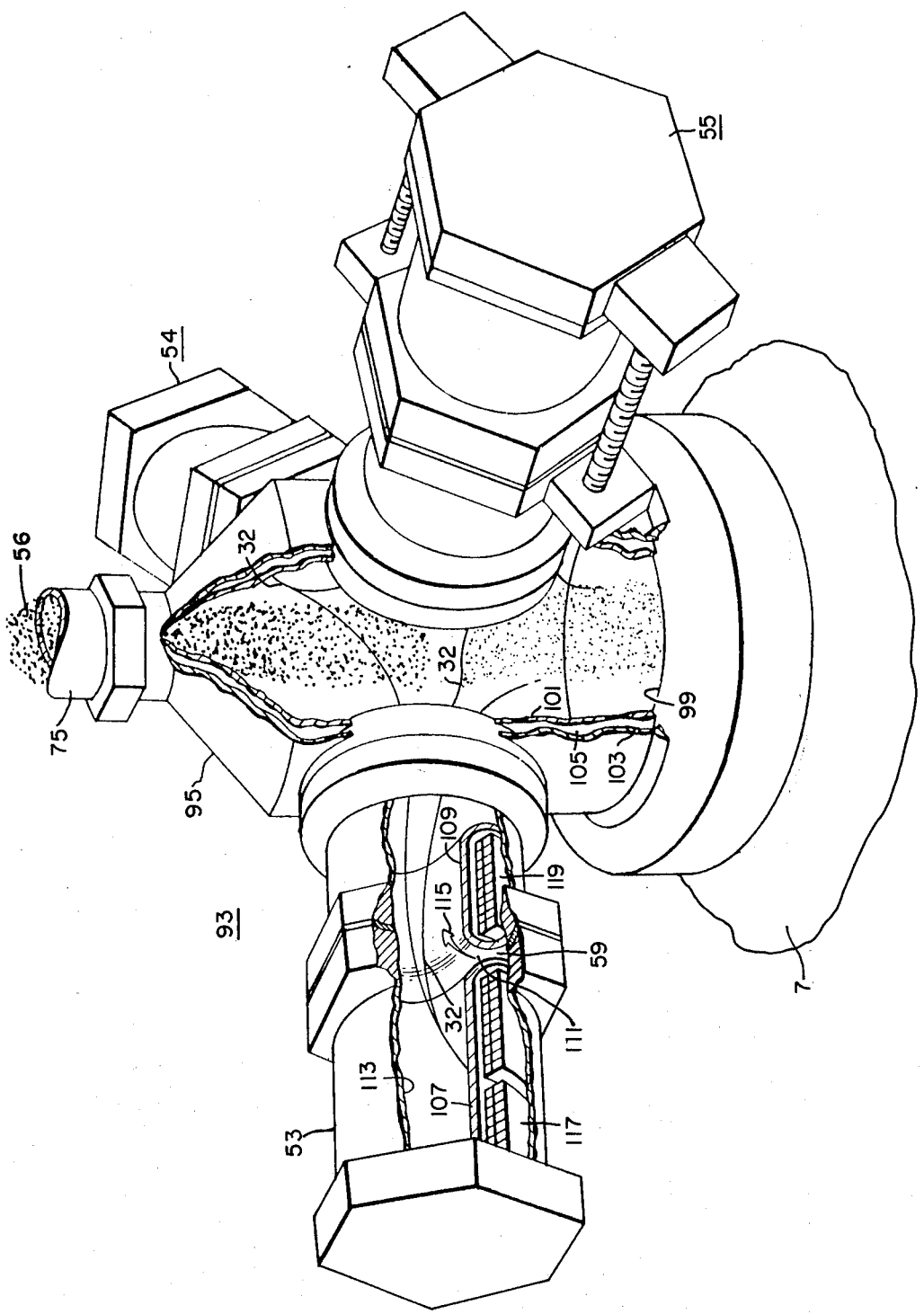
FIG. 7 is a perspective view with broken-away portions showing a three-phase arc heater system.

Typical arc heaters which are suitable for the process disclosed herein are shown in FIGS. 6 and 7 and corresponding to the arc heater 51 of FIG. 2. As shown in FIG. 6 the arc heater 51 has two annular copper electrodes 77, 79 which are spaced at 83 about 1 millimeter apart to accommodate a line frequency power source of about 4 kV. An arc 57 occurs in the space 83 and incoming stock gas 85 immediately blows the arc from the space into the interior of the arc chamber 87. The are 87 rotates at a speed of about 1000 revolutions per second by interaction of the arc current (several thousand amps AC) with a DC magnetic field set up by internally mounted solenoid coils 89, 91. The velocities yield a very high operating efficiency for equipment of this type.

The arc heater system shown in FIG. 7 comprises three arc heaters 53, 54, 55 similar to the system shown in FIG. 5. Each of the arc heaters 53, 54, 55 is a single phase, self stabilizing AC device capable of power levels of up to about 3500 kilowatts or up to 10,000 kilowatts for a three-phase plant insulation. For the practice of this invention, it is preferred that three arc heaters be provided, one for each of the three phases of the AC power supply. Each arc heater comprises two annular copper electrodes 107, 109 having a space or gap of about 1 millimeter to accommodate the line frequency power of about 4kV. A spark 111 occurs in the gap 59 and incoming fuel stock gas 115 immediately blows the spark from the gap into the interior of the arc chamber 113 formed by the aligned electrodes 107, 109 as indicated by the arrow 115. The extended arc 32 rotates at a speed of about 1000 revolutions per second by interaction of the arc current (several thousand amps AC) with a DC magnetic field set up by internally mounted field coils 117, 119. Such velocities result in a very high operating efficiency for equipment of this type. As the gas 59 enters the arc chamber 113, it moves downstream towards the plenum chamber 99. Thus the electrodes 107 and 109 are upstream and downstream electrodes, respectively.

The arc 32 extends into the plenum chamber 33 and merges with corresponding arcs 32 of the other arc heaters 54, 55, whereby the downstream extremity of each arc 32 eventually skips the downstream electrode 109 of each arc heater to complete the circuit through one of the other arcs 32. Thus the three-phase arc heater system (FIG. 7) provides a three wye-connected self-stabilizing arc heater system in which the magnetic particles are readily liquefied to enable their subsequent formation into magnetic spheres.

In conclusion, the advantage of the arc heater-convection process of this invention is twofold and comprises decreased production of ultrafine particles because of much lower heat transfer rates which produce smaller amounts of ultrafine material, so long as the gas velocities are maintained at a modest rate to avoid atomization of the liquid particles; and improved control of magnetite chemistry due to the operation of a closed loop of air and nitrogen or air and steam, the latter of which condenses on the downstream walls to provide the favorable effect of (1) increasing the solid to gas ratio thus simplifying the separation/collection step, and (2) providing a cold wet surface which is resistant to particle buildup.

What is claimed is:

1. A process for producing particulated magnetite spheres by thermal fusion of magnetite ore, comprising:
    a. striking an electric arc in an axial gap between generally hollow, cylindrical electrodes, said electrodes forming a chamber for said arc,
    b. causing the arc to rotate and form a substantially cylindrical arc path between the electrodes,
    c. directing gas through the gap into the arc chamber to thereby form an elongated arc heated gas jet,
    d. introducing particles of magnetite ore having a non-spherical shape with sufficient momentum into the arc heated gas jet to melt the particles to effect spheriodization by formation of droplets by surface tension, and
    e. cooling the droplets to solid state to preserve sphericity.

2. The process of claim 1 in which the arc heated gas jet has a temperature of at least 1600° C.

3. The process of claim 1 in which the arc heated gas jet operates in an atmosphere that comprises from 5 to 21% oxygen.

4. The process of claim 1 in which the particles have a size of from about 44 to 149 microns.

5. The process of claim 1 in which the arc heated gas jet is operated at from about 150 to about 1500 kilowatts.

6. The process of claim 1 in which the droplets are cooled in air.

7. The process of claim 1 in which the droplets are cooled in water spray.

8. The process of claim 1 in which the droplets are cooled in a pool of water.

9. The process of claim 1 in which the droplets are cooled by radiation to the surrounding atmosphere.

* * * * *